US012592772B2

(12) United States Patent
Erkmen et al.

(10) Patent No.: US 12,592,772 B2
(45) Date of Patent: *Mar. 31, 2026

(54) INTEGRATED ON-CHIP WIRELESS OPTICAL COMMUNICATION TERMINAL

(71) Applicant: TAARA CONNECT, INC., Sunnyvale, CA (US)

(72) Inventors: Baris Ibrahim Erkmen, Sunnyvale, CA (US); Devin Brinkley, Redwood City, CA (US); Paul Epp, Sunnyvale, CA (US); John Moody, Belmont, CA (US)

(73) Assignee: TAARA CONNECT, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,915

(22) Filed: Apr. 23, 2024

(65) Prior Publication Data

US 2024/0275484 A1    Aug. 15, 2024

Related U.S. Application Data

(63) Continuation of application No. 17/890,378, filed on Aug. 18, 2022, now Pat. No. 11,996,886.
(Continued)

(51) Int. Cl.
| | |
|---|---|
| *H04B 10/00* | (2013.01) |
| *H04B 10/112* | (2013.01) |
| *H04B 10/50* | (2013.01) |

(52) U.S. Cl.
CPC ......... *H04B 10/112* (2013.01); *H04B 10/503* (2013.01)

(58) Field of Classification Search
CPC .............. H04B 10/112; H04B 10/1123; H04B 10/1125; H04B 10/114; H04B 10/1143;
(Continued)

(56) References Cited

U.S. PATENT DOCUMENTS

| | | |
|---|---|---|
| 5,479,539 A | 12/1995 | Goldsmith et al. |
| 5,543,805 A | 8/1996 | Thaniyavarn |
(Continued)

FOREIGN PATENT DOCUMENTS

| | | |
|---|---|---|
| CN | 110572210 A | 12/2019 |
| CN | 111487602 A | 8/2020 |
(Continued)

OTHER PUBLICATIONS

International Search Report and Written Opinion for Application No. PCT/US2022/032348 dated Sep. 29, 2022 (11 pages).
(Continued)

*Primary Examiner* — Hanh Phan
(74) *Attorney, Agent, or Firm* — Botos Churchill IP Law LLP

(57) ABSTRACT

A free-space optical communication system includes an optical phased array (OPA) photonic integrated chip, a transceiver photonic integrated chip, and one or more processors. The OPA chip includes a plurality of array elements and a plurality of phase shifters. The transceiver chip includes one or more transmitter components and one or more receiver components. The one or more processors are configured to transmit a first signal via the OPA chip and the transceiver chip, and receive a second signal via the OPA chip and the transceiver chip.

19 Claims, 4 Drawing Sheets

Related U.S. Application Data

(60) Provisional application No. 63/246,599, filed on Sep. 21, 2021.

(58) Field of Classification Search
CPC . H04B 10/1149; H04B 10/116; H04B 10/118; H04B 10/40; H04B 10/548; H04B 10/503; H04B 10/5053; H04B 10/5055; G02F 1/2955; G02F 1/292
USPC ....... 398/118, 119, 127, 128, 129, 130, 131, 398/172, 135, 136, 137, 138, 139, 158, 398/159, 183, 188, 33, 38, 25, 26, 27
See application file for complete search history.

(56) References Cited

U.S. PATENT DOCUMENTS

| | | | |
|---|---|---|---|
| 6,741,207 B1 | 5/2004 | Allison et al. | |
| 6,978,093 B2 | 12/2005 | Clark | |
| 7,359,643 B2 | 4/2008 | Aronson et al. | |
| 8,605,761 B2 * | 12/2013 | Hutchin | G01W 1/00 372/29.023 |
| 8,774,635 B2 * | 7/2014 | Juarez | H04B 10/1121 398/118 |
| 8,942,562 B2 * | 1/2015 | Pusarla | H04B 10/112 398/115 |
| 9,683,928 B2 | 6/2017 | Swanson | |
| 9,948,377 B1 | 4/2018 | Kim et al. | |
| 10,419,120 B2 | 9/2019 | Bock et al. | |
| 10,545,289 B1 | 1/2020 | Chriqui et al. | |
| 10,678,117 B2 | 6/2020 | Shin et al. | |
| 11,003,045 B2 | 5/2021 | Hosseini et al. | |
| 11,320,717 B2 | 5/2022 | Zhu et al. | |
| 11,573,294 B2 | 2/2023 | Sun et al. | |
| 11,996,886 B2 * | 5/2024 | Erkmen | H04B 10/1123 |
| 12,153,324 B2 * | 11/2024 | Brinkley | G02F 1/2955 |
| 2013/0202303 A1 | 8/2013 | Wilkinson et al. | |
| 2015/0244458 A1 | 8/2015 | Erkmen et al. | |
| 2015/0323753 A1 | 11/2015 | Furuya et al. | |
| 2017/0237500 A1 | 8/2017 | Nishimoto | |
| 2017/0357142 A1 | 12/2017 | Spector et al. | |
| 2018/0039153 A1 | 2/2018 | Hashemi et al. | |
| 2018/0041279 A1 | 2/2018 | Segura et al. | |
| 2018/0102847 A1 | 4/2018 | Kim et al. | |
| 2018/0123699 A1 | 5/2018 | Fatemi et al. | |
| 2018/0321569 A1 | 11/2018 | Spector et al. | |
| 2018/0359019 A1 | 12/2018 | Han et al. | |
| 2019/0310422 A1 | 10/2019 | Seyedi et al. | |
| 2019/0391243 A1 | 12/2019 | Nicolaescu | |
| 2020/0044739 A1 | 2/2020 | Sugiyama | |
| 2020/0192179 A1 | 6/2020 | Hajimiri | |
| 2020/0244359 A1 | 7/2020 | Csonka et al. | |
| 2020/0280373 A1 | 9/2020 | Palmer et al. | |
| 2020/0319524 A1 | 10/2020 | Hosseini et al. | |
| 2020/0363590 A1 | 11/2020 | Jafari et al. | |
| 2020/0393737 A1 | 12/2020 | Hosseini et al. | |
| 2021/0072384 A1 | 3/2021 | Margallo Balbás | |
| 2021/0103199 A1 | 4/2021 | Wu et al. | |
| 2021/0152243 A1 | 5/2021 | Hosseini et al. | |
| 2021/0215993 A1 | 7/2021 | Byun et al. | |
| 2021/0344170 A1 | 11/2021 | Komljenovic | |
| 2022/0006530 A1 | 1/2022 | Ngo et al. | |
| 2022/0146903 A1 | 5/2022 | Watts et al. | |
| 2022/0155608 A1 | 5/2022 | Phare et al. | |
| 2022/0252908 A1 * | 8/2022 | Inamdar | G01N 21/8806 |
| 2023/0088334 A1 | 3/2023 | Erkmen et al. | |
| 2023/0100620 A1 | 3/2023 | Brinkley et al. | |
| 2023/0282977 A1 | 9/2023 | Mesquita | |

FOREIGN PATENT DOCUMENTS

| | | | |
|---|---|---|---|
| CN | 112034657 A | 12/2020 | |
| CN | 212572557 U | 2/2021 | |
| EP | 0546811 A1 | 6/1993 | |
| JP | H08172215 A | 7/1996 | |
| JP | 2005277521 A | 10/2005 | |
| JP | 2015082836 A | 4/2015 | |
| JP | 2015212781 A | 11/2015 | |
| JP | 2017147622 A | 8/2017 | |
| JP | 2018078644 A | 5/2018 | |
| JP | 2020021015 A | 2/2020 | |
| JP | 2021033304 A | 3/2021 | |
| WO | 2018026514 A1 | 2/2018 | |
| WO | 2019026207 A1 | 2/2019 | |
| WO | 2019207756 A1 | 10/2019 | |
| WO | 2024116124 A1 | 6/2024 | |

OTHER PUBLICATIONS

International Search Report and Written Opinion for Application No. PCT/US2022/041180 mailed Dec. 8, 2022 (14 pages).

International Search Report and Written Opinion for Application No. PCT/US2022/042025 dated Dec. 9, 2022 (14 pages).

Abediasl, Hooman , et al., "Monolithic optical phased-array transceiver in a standard SOI CMOS process" Optics Express, vol. 23, No. 5, Mar. 2, 2015, p. 6509, XP055497279, DOI: 10.1364/OE.23. 006509.

Bazil Raj, Arockia A, et al., "Intensity feedback-based beam wandering mitigation in free-space optical communication using neural control technique", EURASIP Journal on Wireless Communications and Networking 2014, 160 (2014).

Doylend, J. K. , et al., "Two-dimensional free-space beam steering with an optical phased array on silicon-on-insulator", Optical Society of America. 2011.

Guo, Yongjun , et al., "Integrated Optical Phased Arrays for Beam Forming and Steering.", Appl. Sci. Nov. 2021, 4017. https://doi.org/10.3390/app11094017, pp. 1-41.

Hahn, Daniel V., et al., The Johns Hopkins APL Technical Digest, vol. 30, No. 4., 2012, 321-330.

Kwong, David , et al., "On-chip silicon optical phased array for two-dimensional beam steering", Optics letters 39 4 (2014): 941-4.

Leitgeb, E. , et al., "Optical networks, last mile access and applications", Journal of Optical Fiber Communications Reports 2, Springer Science+Business Media Inc., 2005, 56-85.

Liu, Yaqi , et al., "A single-chip multi-beam steering optical phased array: design rules and simulations", Optics Express vol. 29, Issue 5, pp. 7049-7059 (2021).

Ramasarma, Vaidyanathan , "Free Space Optics: A Viable Last-Mile Solution", Bechtel Telecommunications Technical Journal, vol. 1, No. 1., Dec. 1-9, 2002.

Stepanova, Daria , et al., "Developing A Highly Accurate Pointing System for Free Space optical Communications", Journal of Communications vol. 14, No. 12, Dec. 2019.

Wang, Pengfei , et al., "Design and fabrication of a SiN—Si dual-layer optical phased array chip", Photonics Research vol. 8, No. 6, pp. 912-919 (Jun. 2020).

Zhang, Haiyang , et al., "Fast beam steering enabled by a chip-scale optical phased array with 8×8 elements", Optics Communications, vol. 461, 2020, 125267, ISSN 0030-4018.

Office Action for Japanese Patent Application No. 2024-517498, Oct. 18, 2024, 10 Pages.

The First Office Action for Chinese Patent Application No. 202280071081.7, Nov. 2, 2024, 20 Pages.

Notice of Reasons for Rejection for Japanese Patent Application No. 2024-517509, Oct. 8, 2024, 12 Pages.

The First Chinese Office Action for Chinese Patent Application No. 202280071082.1, Sep. 25, 2024, 17 Pages.

Office Action for Japanese Patent Application No. 2024-517494, May 26, 2025, 8 Pages.

Office Action for Japanese Patent Application No. 2024-517498, Mar. 25, 2025, 10 Pages.

* cited by examiner

100

200

300

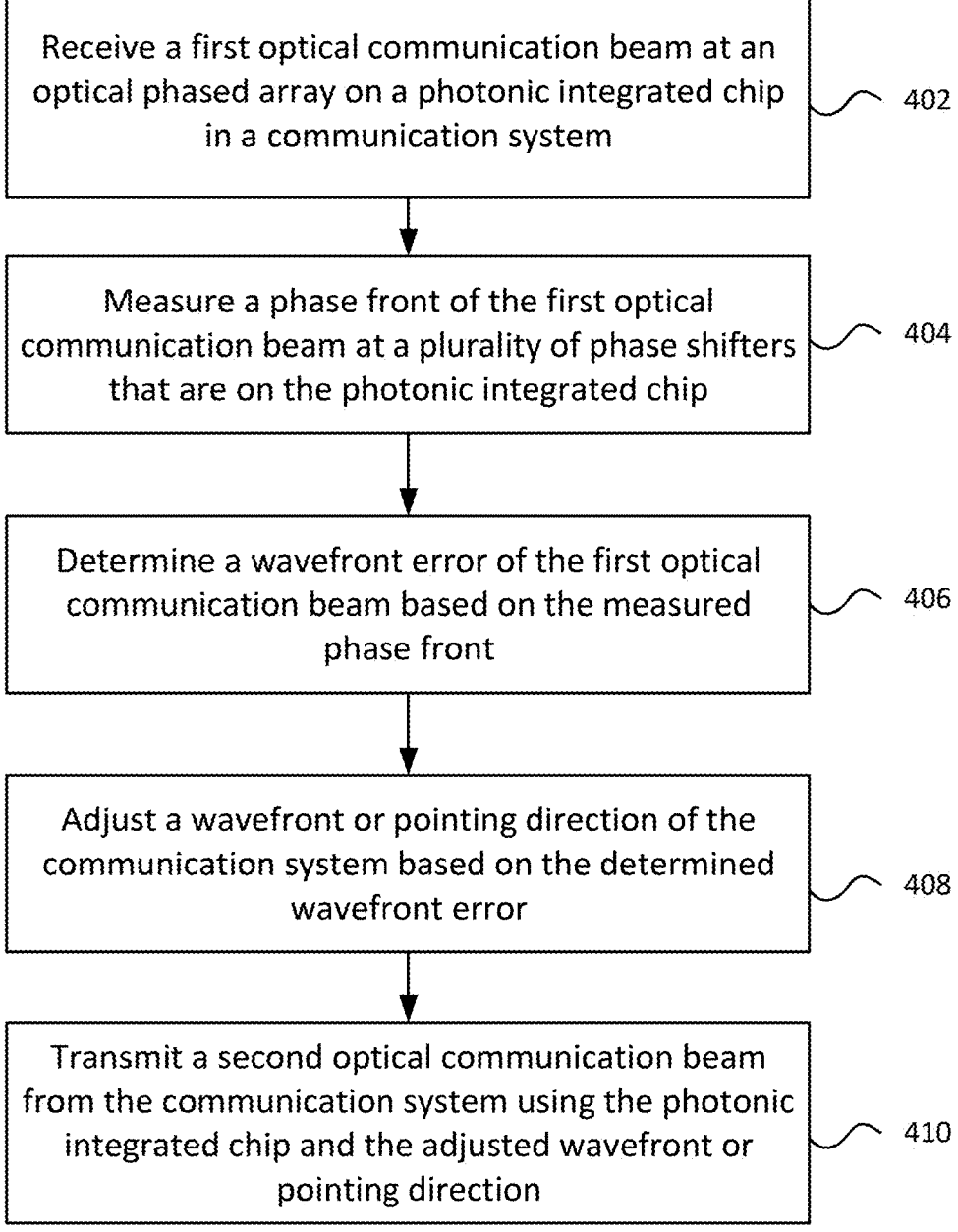

Receive a first optical communication beam at an optical phased array on a photonic integrated chip in a communication system          402

Measure a phase front of the first optical communication beam at a plurality of phase shifters that are on the photonic integrated chip          404

Determine a wavefront error of the first optical communication beam based on the measured phase front          406

Adjust a wavefront or pointing direction of the communication system based on the determined wavefront error          408

Transmit a second optical communication beam from the communication system using the photonic integrated chip and the adjusted wavefront or pointing direction          410

INTEGRATED ON-CHIP WIRELESS OPTICAL COMMUNICATION TERMINAL

CROSS-REFERENCE TO RELATED APPLICATIONS

The present application is a continuation of U.S. patent application Ser. No. 17/890,378, filed Aug. 18, 2022, which claims the benefit of the filing date of U.S. Provisional Application No. 63/246,599, filed Sep. 21, 2021, the entire disclosures of which are incorporated by reference herein.

BACKGROUND

Wireless optical communication enables high-throughput and long-range communication, in part due to high gain offered by the narrow angular width of the transmitted beam. However, the narrow beam also requires that it must be accurately and actively pointed in order to remain aligned to the terminal aperture at the remote end. This pointing may be accomplished by small mirrors (e.g., MEMS or voice-coil based fast-steering mirror mechanisms) that are actuated to steer the beam. In other implementations, electro-optic steering of beams with no moving parts is used to steer the beam, which provides cost, lifetime and performance advantages. Optical Phased Arrays (OPAs) are a critical technology component, with added benefits on adaptive-optics, point-to-multipoint support, and mesh network topologies. Each active element in the OPA requires electro-optic phase shifting capability.

BRIEF SUMMARY

Aspects of the disclosure provide for a free-space optical communication system. The free-space optical communication system includes an optical phased array (OPA) chip that has a plurality of array elements, and a plurality of phase shifters; a transceiver chip that has one or more transmitter components, and one or more receiver components; and one or more processors configured to transmit a first signal via the OPA chip and the transceiver chip, and receive a second signal via the OPA chip and the transceiver chip.

In one example, the system also includes a plurality of lenses forming a telescope that captures light from free space and transmits light from the OPA chip. In another example, the system also includes a single mode circulator and a single mode waveguide connecting the OPA chip and the single mode circulator. In a further example, the one or more transmitter components include a seed laser. In yet another example, the one or more receiver components include a sensor. In this example, the one or more receive components also include an attenuator and an amplifier. In a still further example, the system also includes an amplifier that increases a gain of the first signal between the transceiver chip and the OPA chip. In another example, the system also includes a steering mirror; and the one or more processors are also configured to control the steering mirror to adjust a wavefront or pointing direction of the first signal and the second signal.

Other aspects of the disclosure provide for a method for performing wavefront correction for optical communication. The method includes receiving, at an optical phased array on a photonic integrated chip in a communication system, a first optical communication beam; measuring, by one or more processors of the communication system, a phase front of the first optical communication beam at a plurality of phase shifters that are on the photonic integrated chip; determining, by the one or more processors, a wavefront error of the first optical communication beam based on the measured phase front; adjusting, by the one or more processors, a wavefront or pointing direction of the communication system based on the determined wavefront error; and transmitting, by the one or more processors, a second optical communication beam using the photonic integrated chip and the adjusted wavefront or pointing direction.

In one example, the measuring of the phase front includes detecting phase-shift settings at the plurality of phase shifters. In another example, the determining of the wavefront error includes determining a tip term and a tilt term. In a further example, the adjusting of the wavefront or pointing direction includes mechanical steering of a mirror. In yet another example, the adjusting of the wavefront or pointing direction includes electronic steering using the plurality of phase shifters. In a still further example, the adjusting of the wavefront or pointing direction includes controlling a secondary steering element for larger-scale, low frequency adjustments; and controlling the photonic integrated chip for smaller-scale, high frequency adjustments.

In another example, a first set of processors of the one or more processors performs the measuring of the phase front, the determining of the wavefront error, and the adjusting of the wavefront or pointing direction; and a second set of processors of the one or more processors performs transmitting of the second optical communication beam. In this example, the measuring of the phase front, the determining of the wavefront error, and the adjusting of the wavefront or pointing direction comprise a feedback loop. Further in this example, the method also includes tracking, using the feedback loop, changes of the first optical communication beam.

BRIEF DESCRIPTION OF THE DRAWINGS

FIG. 4 is a flow diagram in accordance with aspects of the disclosure.

DETAILED DESCRIPTION

Overview

Figure 1:
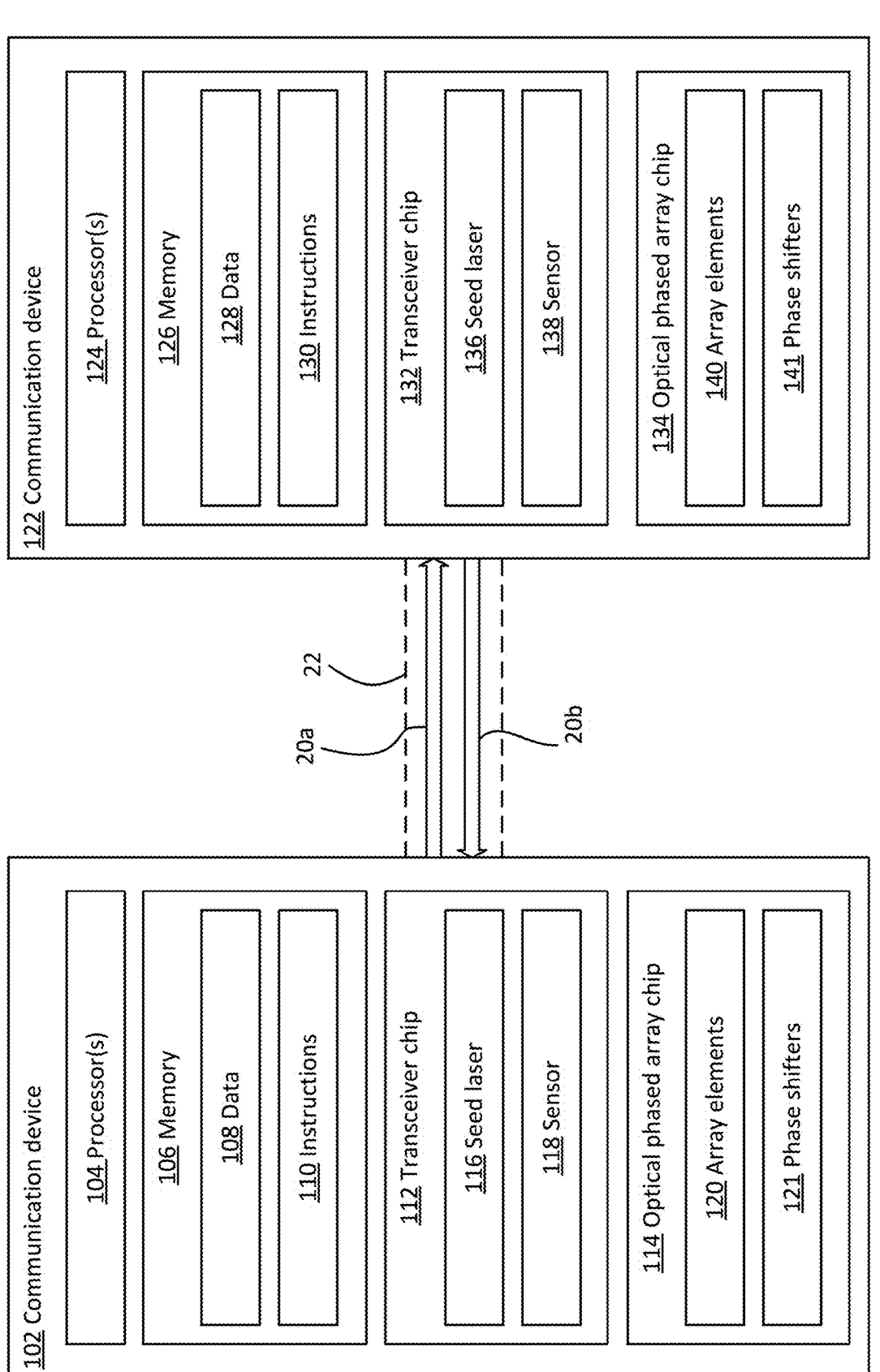
FIG. 1 is a block diagram 100 of a first communication device and a second communication device in accordance with aspects of the disclosure.

The technology relates to a system architecture for a wireless optical communication terminal that can be integrated on one or more photonic integrated chips. The system architecture may be configured to combine and streamline multiple functions and leverage innovations in pointing/beam steering, acquisition, and tracking. For example, the chip may be used for both alignment and communication functions, which eliminates any boresight error from a separate alignment or tracking architecture. The system architecture may include photonic integrated transceivers and software-defined optical modems.

The system architecture may include an optical phased array (OPA) photonic integrated circuit or chip designed to provide wavefront correction of an incoming beam. In particular, the OPA chip may be designed with an OPA having a high enough element count and density to provide a high enough spatial resolution for providing wavefront correction. The OPA chip may include a plurality of phase shifters configured to control signals received by and transmitted from the array elements of the OPA. The OPA chip may also include a single-path, fully reciprocal optical design that is connected to a single transceiver component for receiving and transmitting an optical beam.

A secondary steering element may be included in the system to further adjust the angle of arrival of the incoming beam to better position the incoming beam at a sensor or optical fiber of the terminal. The secondary steering element may be a steering mirror, such as a fast-steering/fast pointing mirror, or other type of steerable element controlled by an actuator. Alternatively, the secondary steering element may be a liquid crystal, spatial light modulator, or other type of signal modulation means.

One or more processors of the system may use the OPA to determine the incoming beam's angle of arrival. For example, a phase front of the incoming beam may be measured and extracted based on the beam portion received at each array element of the OPA and the spatial resolution of the overall OPA. Namely, phase-shift settings of the plurality of phase shifters for the incoming beam may be extracted and used for calculating a wavefront error and a corresponding wavefront correction. The wavefront error may include tip and tilt terms (e.g., terms of an estimated angle of arrival), as well as higher order terms associated with other variations in the beam. Variations in the beam may be caused by environmental disturbances, atmospheric turbulence, or other external factors.

The one or more processors may cause mechanical or electronic steering based on the calculated wavefront correction. For example, the one or more processors may control the secondary steering element, the OPA, or both to make the wavefront correction. In a hybrid tracking configuration, the secondary steering element may be controlled for larger-scale and/or low frequency adjustments, and the OPA may be controlled for smaller-scale and/or higher frequency adjustments. Once the wavefront correction is implemented for the incoming beam, the single transmit-receive design of this system architecture inherently performs a pre-correction waveform distortion of a transmit beam from the terminal based on the same correction. Reciprocity of beam propagation in atmospheric turbulence ensures that the pre-distortion based on the local received correction maximizes the power coupling in the reverse direction across a communication link.

The system architecture may also include an on-chip single-mode transceiver that fully integrates photonics that are conventionally discrete components. For example, photonics such as filters, multiplexers, demultiplexers, photodetectors, optical amplifiers, variable optical attenuators, and electronic circuitry may be integrated on a single chip. The transceiver chip is configured to receive and process optical beams being received and transmitted by the terminal. In some implementations, the transceiver chip may be integrated as part of the OPA chip.

Overall, this design also enables a low-cost system that can still operate at sensitivities and data rates only previously achievable with systems that use expensive adaptive optics to couple into single-mode fibers. The integrated chip designs enable cost savings associated with sourcing and manufacturing components, such as the transceiver and filter components. The system architecture also advantageously supports both IM/DD (intensity modulation and direct detection) and coherent (homodyne, heterodyne, intradyne) systems.

In this design, components dedicated to tracking or alignment, such as beacon beams, dedicated optics, or dedicated sensors, may be omitted from the system. The labor-intensive manufacturing and maintenance steps for aligning the tracking/alignment components with the communication link may also be omitted. Similar omissions may be made in the manufacturing and maintenance steps for the alignment between the transmit and receive architectures since the transmit and receive architectures share components and paths.

In addition, optoelectrical beam steering using the OPA may be the primary means for alignment and tracking instead of optomechanical beam steering, resulting in fewer moving components and fewer errors. Additionally or alternatively, including the secondary steering element in the system allows the use of an OPA with relatively low element count, such as less than 1000 elements, which may lower the costs associated with the OPA in manufacture, power consumption, thermal management, and electrical interfaces, among others. In some other examples, the OPA may be designed with a large enough element density and count to accomplish all the steering capability, which would allow for the omission of all other steering components from the system altogether.

Overall, this system architecture for an optical communication terminal reduces the number of optical components, the assembly tolerances, optical quality requirements, and therefore, ultimately reduces the cost of the optical assembly and wireless optical communication terminal.

Example Systems

Figure 2:
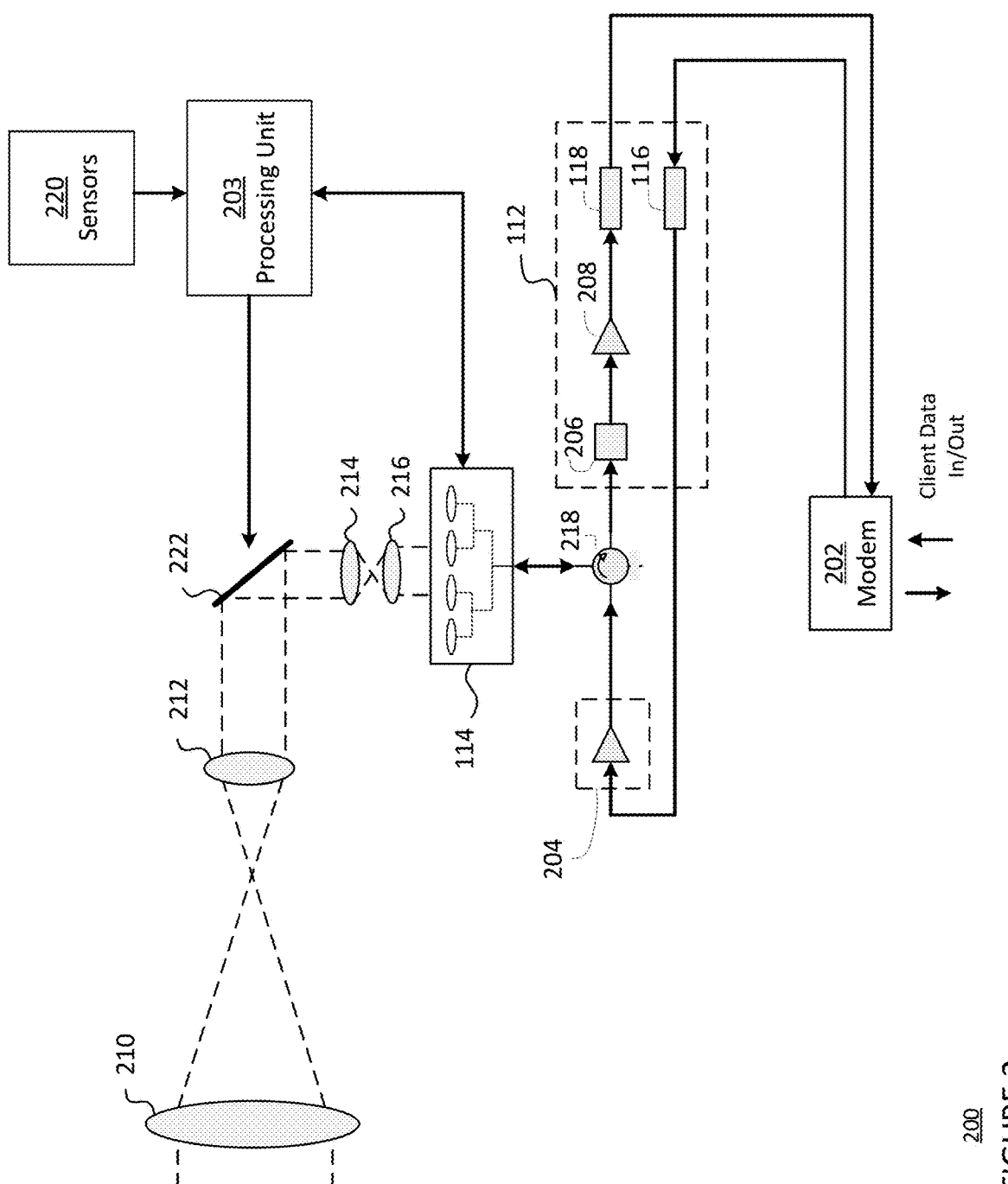
FIG. 2 is a pictorial diagram 200 of an example system architecture for the first communication device of FIG. 1 in accordance with aspects of the disclosure.

FIG. 1 is a block diagram 100 of a first communication device of a first communication terminal configured to form one or more links with a second communication device of a second communication terminal, for instance as part of a system such as a free-space optical communication (FSOC) system. FIG. 2 is a pictorial diagram 200 of an example system architecture for the first communication device in FIG. 1. For example, a first communication device 102 includes one or more processors 104, a memory 106, a transceiver photonic integrated chip 112, and an optical phased array (OPA) photonic integrated chip 114. In some implementations, the first communication device 102 may include more than one transceiver chip and/or more than one OPA chip.

The one or more processors 104 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 104 and memory 106 as being within the same block, such as in a modem 202 for digital signal processing shown in FIG. 2, the one or more processors 104 and memory 106 may actually comprise multiple processors and memories that may or may not be stored within the same physical housing, such as in both the modem 202 and a separate processing unit 203. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communication device, such as memory 106, calibration information, such as one or more offsets determined for tracking a signal, may be stored.

Data 108 may be retrieved, stored or modified by the one or more processors 104 in accordance with the instructions 110. For instance, although the system and method is not limited by any particular data structure, the data 108 may be stored in computer registers, in a relational database as a table having a plurality of different fields and records, XML documents or flat files. The data 108 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 108 may comprise any information sufficient to identify the relevant information, such as numbers, descriptive text, proprietary codes, references to data stored in other areas of the same memory or different memories (including other network locations) or information that is used by a function to calculate the relevant data.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 may be in communication with the transceiver chip 112. As shown in FIG. 2, the one or more processors in the modem 202 may be in communication with the transceiver chip 112, being configured to receive and process incoming optical signals and to transmit optical signals. The transceiver chip 112 may include one or more transmitter components and one or more receiver components. The one or more processors 104 may therefore be configured to transmit, via the transmitter components, data in a signal, and also may be configured to receive, via the receiver components, communications and data in a signal. The received signal may be processed by the one or more processors 104 to extract the communications and data.

The transmitter components may include at minimum a light source, such as seed laser 116. Other transmitter components may include an amplifier, such as a high-power semiconductor optical amplifier 204. In some implementations, the amplifier is on a separate photonics chip. The seed laser 116 may be a distributed feedback laser (DFB), light-emitting diode (LED), a laser diode, a fiber laser, or a solid-state laser. The light output of the seed laser 116, or optical signal, may be controlled by a current, or electrical signal, applied directly to the seed laser, such as from a modulator that modulates a received electrical signal. Light transmitted from the seed laser 116 is received by the OPA chip 114.

The receiver components may include at minimum a sensor 118, such as a photodiode. The sensor may convert the received light, or optical signal, into an electrical signal that can be processed by the one or more processors. Other receiver components may include an attenuator, such as a variable optical attenuator 206, an amplifier, such as a semiconductor optical amplifier 208, or a filter.

The one or more processors 104 may be in communication with the optical phased array chip 114. The OPA chip 114 receives light from the transmitter components and outputs the light as a coherent communication beam to be received by a remote communication device, such as second communication device 122. The OPA chip 114 also receives light from free space, such as a communication beam from second communication device 122, and provides it to the receiver components.

The OPA chip 114 may include a plurality of array elements 120 and a plurality of phase shifters 121. The plurality of array elements 120 may be arranged in a grid pattern with a consistent pitch, or distance, between adjacent elements. In other examples, the array elements 120 may be in different arrangements having different numbers of rows and columns, different shapes, and/or different pitch (consistent or inconsistent). The phase shifters 121 alter incoming and outgoing light. The incoming light is provided to the receiver components, and the outgoing light is provided to the array elements 120. The architecture for the plurality of phase shifters 121 includes at least one layer of phase shifters having one phase shifter connected to each array element in the plurality of array elements 120. In some examples, the phase shifter architecture includes a plurality of layers of phase shifters, where phase shifters in a first layer may be connected in series with one or more phase shifters in a second layer. The OPA chip may provide the necessary photonic processing to combine an incoming optical beam into a single-mode waveguide that directs the beam towards the transceiver chip 112. In some implementations, the OPA chip may also generate and provide an angle of arrival estimate to the one or more processors 104, such as those in processing unit 203.

The system may include additional components to support functions of the communication terminal. For example, the system may include one or more lenses and/or mirrors that form a telescope. The telescope may receive collimated light and output collimated light. The telescope may include an objective portion, an eyepiece portion, or a relay portion. As shown in FIG. 2, the system may include an objective lens 210, an eyepiece lens 212, and relay lenses 214, 216. The system may include a circulator, such as a single mode circulator 218, that routes incoming light and outgoing light while keeping them on at least partially separate paths. The system may include one or more sensors 220 for detecting measurements of environmental features and/or system components. The system may include one or more steering mechanisms, such as one or more bias means for controlling one or more phase shifters, which may be part of the OPA chip 114, and/or an actuated/steering mirror 222, such as a fast/fine pointing mirror. In some examples, the actuated mirror may be a MEMS 2-axis mirror, 2-axis voice coil mirror, or a piezoelectric 2-axis mirror. The one or more processors 104, such as those in the processing unit 203, may be configured to receive and process signals from the one or more sensors 220, the transceiver chip 112, and/or the OPA chip 114 and to control the one or more steering mechanisms to adjust a pointing direction and/or wavefront shape, described in more detail below. The system also includes optical fibers, or waveguides, connecting optical components, creating a path between the seed laser 116 and OPA chip 114 and a path between the OPA chip 114 and the photodiode 118.

As shown in FIG. 1, the first communication device 102 may output an optical beam 20a pointed towards a second communication device 122.

Similarly, the second communication device 122 includes one or more processors, 124, a memory 126, a transceiver chip 132, and an OPA chip 134. The one or more processors 124 may be similar to the one or more processors 104 described above. Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transceiver chip 132 and the OPA chip 134 of the second communication device 122 may be similar to the transceiver chip 112 and the OPA chip 114. The transceiver chip 132 may include both transmitter components and receiver components. The transmitter components may include a light source, such as seed laser 136 configured similar to the seed laser 116. Other transmitter components may include an amplifier, such as a high-power semiconductor optical amplifier. The receiver components may include a sensor 138 configured similar to sensor 118. Other receiver components may include an attenuator, such as a variable optical attenuator, an amplifier, such as a semiconductor optical amplifier, or a filter. The OPA chip 114 may include a plurality of array elements 140 and a plurality of phase shifters 141, which may be similar to array elements 120 and phase shifters 121, respectively. Additional components for supporting functions of the communication device 122 may be included similar to the additional components described above. The communication device 122 may have a system architecture that is same or similar to the system architecture shown in FIG. 2.

As shown in FIG. 1, the second communication device 122 may output an optical beam 20b pointed towards the first communication device 102, which receives the optical beam 20b.

As shown in FIG. 1, the communication link 22 may be formed between the first communication device 102 and the second communication device 122 when the transceivers of the first and second communication devices are aligned. The alignment can be determined using the optical beams 20a, 20b to determine when line-of-sight is established between the communication devices 102, 122. Using the communication link 22, the one or more processors 104 can send communication signals using the optical beam 20a to the second communication device 122 through free space, and the one or more processors 124 can send communication signals using the optical beam 20b to the first communication device 102 through free space. The communication link 22 between the first and second communication devices 102, 122 allows for the bi-directional transmission of data between the two devices. In particular, the communication link 22 in these examples may be free-space optical communications (FSOC) links. In other implementations, one or more of the communication links 22 may be radio-frequency communication links or other type of communication link capable of travelling through free space.

Figure 3:
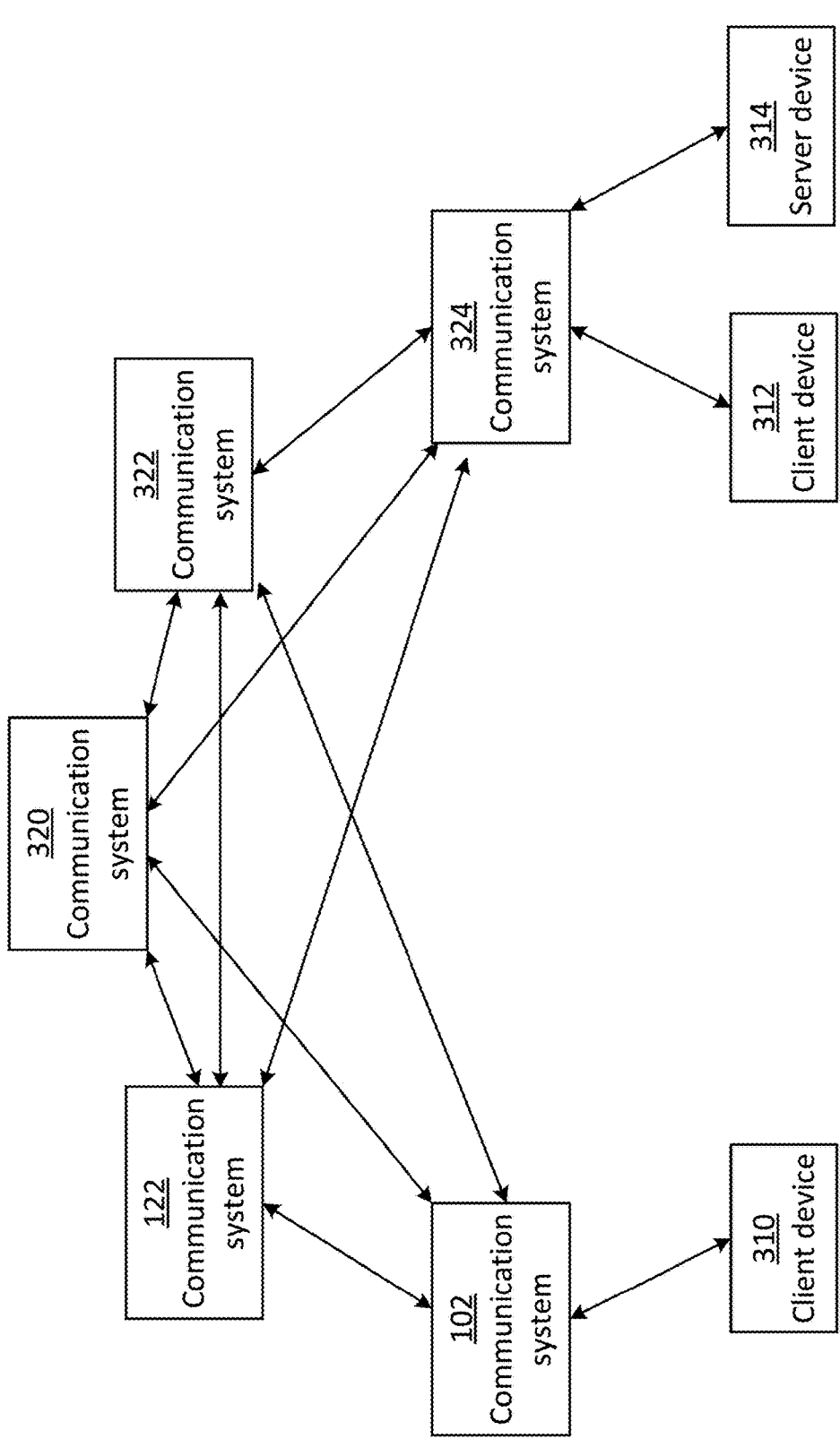
FIG. 3 is a pictorial diagram of a network in accordance with aspects of the disclosure.

As shown in FIG. 3, a plurality of communication devices, such as the first communication device 102 and the second communication device 122, may be configured to form a plurality of communication links (illustrated as arrows) between a plurality of communication terminals, thereby forming a network 300. The network 300 may include client devices 310 and 312, server device 314, and communication devices 102, 122, 320, 322, and 324. Each of the client devices 310, 312, server device 314, and communication devices 320, 322, and 324 may include one or more processors, a memory, a transceiver chip, an OPA chip similar to those described above. Using the transmitter and the receiver, each communication device in network 300 may form at least one communication link with another communication device, as shown by the arrows. The communication links may be for optical frequencies, radio frequencies, other frequencies, or a combination of different frequency bands. In FIG. 3, the communication device 102 is shown having communication links with client device 310 and communication devices 122, 320, and 322. The communication device 122 is shown having communication links with communication devices 102, 320, 322, and 324.

The network 300 as shown in FIG. 3 is illustrative only, and in some implementations the network 300 may include additional or different communication terminals. The network 300 may be a terrestrial network where the plurality of communication devices is on a plurality of ground communication terminals. In other implementations, the network 300 may include one or more high-altitude platforms (HAPs), which may be balloons, blimps or other dirigibles, airplanes, unmanned aerial vehicles (UAVs), satellites, or any other form of high-altitude platform, or other types of moveable or stationary communication terminals. In some implementations, the network 300 may serve as an access network for client devices such as cellular phones, laptop computers, desktop computers, wearable devices, or tablet computers. The network 300 also may be connected to a larger network, such as the Internet, and may be configured to provide a client device with access to resources stored on or provided through the larger computer network.

Example Methods

In operation, the one or more processors 104 may perform wavefront correction for optical communication. In FIG. 4, flow diagram 400 is shown in accordance with some of the aspects described above that may be performed by the one or more processors 104 of the first communication device 102. Additionally or alternatively, the one or more processors 124 of the second communication device 122 may perform one or more steps of the flow diagram 400. While FIG. 4 shows blocks in a particular order, the order may be varied and that multiple operations may be performed simultaneously. Also, operations may be added or omitted.

At block 402, a first optical communication beam may be received at an optical phased array on a photonic integrated chip in a communication system. The first optical communication beam may carry data from a remote communication system or a client device. The first optical communication beam may be received at a plurality of array elements of the optical phased array. Each beam portion received at a given array element may be directed through at least one phase shifter. The beam portions are coupled to a waveguide, which directs the collected beam portions to receiver components of the communication system to be processed. The data may be processed and/or transmitted to a next hop in a network. For example, the optical beam 20b may be received at the optical phased array at OPA chip 114 of communication device 102. The optical beam 20b may be directed through the phase shifters 121 at OPA chip 114 and coupled to a single mode waveguide, which directs the optical beam to receiver components such as sensor 118.

At block 404, one or more processors of the communication system may measure a phase front of the first optical communication beam at a plurality of phase shifters that are on the photonic integrated chip. Phase shift settings may be detected for each phase shifter, and the settings may be used to determine the phase front. For example, the one or more processors 104 of communication device 102 may measure the phase front of the optical beam 20b based on signals received from the plurality of phase shifters 121.

At block 406, the one or more processors may determine a wavefront error of the first optical communication beam based on the measured phase front. The determination of the wavefront error may include determining terms related to an angle of arrival of the wavefront of the optical beam. The terms may include a combination of tip, tilt, or higher order terms. For example, the one or more processors 104 may determine a wavefront error of the optical beam 20b based on the measured phase front.

At block 408, the one or more processors may adjust a wavefront or pointing direction of the communication system based on the determined wavefront error. The wavefront and/or pointing direction may be adjusted using mechanical steering, electronic steering, or a combination of both. The mechanical steering may include controlling an angle of a secondary steering element, such as an actuated mirror. The electronic steering may include controlling the plurality of phase shifters, such as by setting phase shift settings for each phase shifter. In some implementations, steering the secondary steering element may be used for larger-scale, low frequency adjustments, and steering using the plurality of phase shifters may be for smaller-scale, high frequency adjustments. For example, the one or more processors 104 may adjust a wavefront and/or pointing direction of the communication device 102 based on the determined wavefront error. The mechanical steering may include controlling the steering mirror 222. The electronic steering may include controlling the plurality of phase shifters 121.

At block 410, the one or more processors may transmit a second optical communication beam using the photonic integrated chip and the adjusted wavefront and/or pointing direction. For example, the one or more processors 104 may transmit an optical beam 20a using the array elements 120 and the phase shifters 121 of the OPA chip 114 and the adjusted pointing direction. The pre-distortion of the wavefront and the pointing direction, based on the local received correction, may enable maximizing the power coupling in the reverse direction across a communication link because of the reciprocity of beam propagation through the atmosphere.

In some implementations, a first set of processors of the one or more processors performs the measuring of the phase front, the determining of the wavefront error, and the adjusting of the pointing direction, while a second set of processors of the one or more processors performs transmitting of the second optical communication beam. The measuring of the phase front, the determining of the wavefront error, and the adjusting of the pointing direction may comprise a feedback loop. Using the feedback loop, changes of the first optical communication beam may be tracked by the one or more processors. Changes may include position changes, such as drift, fading or scintillation, or other types of changes.

The features described herein may provide a more cost-effective and accurate communication system by implementing integrated photonic chips. The single path transmit-receive design of this system mode system allows for use of less complex and less expensive components. In addition, the design also reduces error in alignment between communication devices, as well as the errors in alignment between the tracking system and the communication system inside each terminal. The design may also reduce error by replacing a boresight requirement between the tracking and communication beams with a feedback loop that is connected directly to the communication beam, and not a diverted beam.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A free-space optical communication system comprising:

an optical phased array (OPA) chip configured to receive one or more optical communication beams, the OPA chip including:
a plurality of array elements, and
a plurality of phase shifters; and
one or more processors configured to:
measure one or more phase fronts of the received one or more optical communication beams;
determine a wavefront error of the received one or more optical communication beams based on the measured one or more phase fronts; and
adjust a wavefront or pointing direction of the system based on the determined wavefront error.

2. The system of claim 1, wherein the one or more processors are further configured to transmit one or more communication beams using the adjusted wavefront or pointing direction.

3. The system of claim 1, wherein the OPA chip is further configured to transmit one or more optical communication beams.

4. The system of claim 1, wherein the one or more phase fronts of the received one or more optical communication beams are measured at the plurality of phase shifters.

5. The system of claim 4, wherein the one or more processors are further configured to detect phase-shift settings at the plurality of phase shifters in the measurement of the one or more phase fronts of the received one or more optical communications beams.

6. The system of claim 1, wherein the one or more processors are further configured to determine a tip term and a tilt term in the determination of the wavefront error of the received one or more optical communication beams.

7. The system of claim 1, further comprising a plurality of lenses forming a telescope configured to capture light from free space and to transmit light from the OPA chip.

8. The system of claim 1, further comprising a single mode circulator and a single mode waveguide connecting the OPA chip and the single mode circulator.

9. The system of claim 1, further comprising a steering mirror, wherein the one or more processors are further configured to control the steering mirror to adjust the wavefront or pointing direction of the system.

10. The system of claim 1, wherein the one or more processors are further configured to electronically steer the plurality of phase shifters to adjust the wavefront or pointing direction of the system.

11. A free-space optical communication system comprising:

a transceiver chip configured receive one or more optical communication beams, the transceiver chip including:
one or more transmitter components, and
one or more receiver components; and
one or more processors configured to:
measure one or more phase fronts of the received one or more optical communication beams;
determine a wavefront error of the received one or more optical communication beams; and
adjust a wavefront or pointing direction of the system based on the determined wavefront error.

12. The system of claim 11, wherein the one or more processors are further configured to transmit one or more communication beams using the adjusted wavefront or pointing direction.

13. The system of claim 11, wherein the transceiver chip is further configured to transmit one or more optical communication beams.

14. The system of claim 11, wherein the one or more processors are further configured to determine a tip term and a tilt term in the determination of the wavefront error of the received one or more optical communication beams.

15. The system of claim 11, further comprising a plurality of lenses forming a telescope configured to capture light from free space and to transmit light from the system.

16. The system of claim 11, further comprising a steering mirror, wherein the one or more processors are further configured to control the steering mirror to adjust the wavefront or pointing direction of the system.

17. The system of claim 11, wherein the one or more transmitter components include a seed laser.

18. The system of claim 11, wherein the one or more receiver components include a sensor.

19. The system of claim 18, wherein the one or more receiver components further include an attenuator and an amplifier.

\* \* \* \* \*